Moy

United States Patent [19]

[11] Patent Number: 5,330,271
[45] Date of Patent: Jul. 19, 1994

[54] BEARING FOR HATCH COVER OR THE LIKE
[75] Inventor: James Moy, Norwell, Mass.
[73] Assignee: Quamco, Inc., Rockland, Mass.
[21] Appl. No.: 10,611
[22] Filed: Jan. 28, 1993
[51] Int. Cl.⁵ .............................................. F16C 29/02
[52] U.S. Cl. ....................................... 384/13; 384/36; 384/42; 114/201 R
[58] Field of Search ................ 384/41, 42, 26, 36, 384/911, 13; 114/201 R, 202; 277/180, 230

[56] References Cited

U.S. PATENT DOCUMENTS 3,924,907 12/1975 Czernik et al. ........................ 384/36
4,238,137 12/1980 Furchak et al. ....................... 384/36
4,846,089 7/1989 Cedergreen ...................... 114/201 R
5,215,314 6/1993 Nakaya ................................. 277/180

Primary Examiner—Lenard A. Footland
Attorney, Agent, or Firm—Chilton, Alix & Van Kirk

[57] ABSTRACT

The self-lubricating bearing suitable for marine applications, such as supporting hatch covers, has a bearing surface defined by a flexible woven pad. This woven pad is draped over a pillow plate and captured in position by a sheet metal member which is folded over and thus engages the edge regions of the pad. The sheet metal member is affixed to the pillow plate and an underlying base plate.

14 Claims, 2 Drawing Sheets

BEARING FOR HATCH COVER OR THE LIKE

BACKGROUND OF THE INVENTION

1. Field of the Invention

The present invention relates to the provision of support for very large and heavy loads while simultaneously permitting limited movement of such loads in response to applied forces, and particularly forces which are exerted in directions which vary. More specifically, the present invention is directed to bearings which are suitable for use in a marine environment and especially to replaceable bearings which are capable of supporting hatch covers. Accordingly, the general objects of the present inventions provide novel and improved methods and apparatus of such character.

2. Description of the Prior Art

While not limited thereto in its utility, the present invention is particularly well suited for use as a bearing on which a hatch cover of a sea-going vessel may be supported. Such hatch covers are often extremely large and, in the case of vessels designed to transport containerized cargos, loaded containers may be stored both in the ship's hold beneath the hatch cover and on top of the hatch cover. Hatch covers are customarily supported on pads which are provided on the ship's coaming. These pads contact the underside of support members provided on the peripheral portion of the hatch cover. The load being supported by the pads may be extremely large because of the size and weight of the hatch cover itself and, as noted above, because of the fact that containerized cargo will customarily be stacked on top of the hatch cover.

When a ship is in motion, as a result of wave action, the coaming will try to move relative to the hatch cover and, accordingly, forces will be applied to the hatch cover. In order to keep the forces applied to the cover within safe limits, i.e., to prevent hatch cover damage, a limited amount of relative motion between the cover and the coaming must be accommodated. Additionally, the ingress of salt water into the hold of the vessel in regions between the support pads must be prevented. The required weathertight seal is accomplished through the use of an elastomeric seal which is located about the underside of the perimeter of the hatch cover. The means by which the hatch cover is supported, in addition to permitting relative motion as discussed above, must also insure the integrity of the seal by maintaining the height of the gap to be sealed within design limits.

In the prior art the interface between a hatch cover and the cooperating support pads has been metal-on-metal. Relative sliding movement between the hatch cover and coaming in response to pitch and roll of the ship has resulted in excessive wear of the planar contact surface of the pads and particularly galling. Such surface wear, in turn, increases the possibility that the hatch cover will bind on the pad and stresses will thus be applied through the pad to the hatch cover causing structural damage. In addition, wear of the surfaces of the contact pads may result in failure of the hatch cover seal, i.e., the seal may be subjected to excessive compression and will thus fracture. Hatch cover seal failure is a major concern, particularly for vessels registered in the U.S., since the seals are tested while in a U.S. port by being subjected to a high pressure stream of water. The penalty for ineffective hatch cover seals, because they present the possibility of hold flooding with calamitous results, is loss of license. Repair or replacement of hatch cover support pads and a damaged hatch cover or hatch cover seal resulting from pad wear is, of course, a time consuming and expensive endeavor. Maintenance of hatch cover support pads is difficult since container vessels are typically in port only long enough to unload and reload and repairs and maintenance must be performed around the load/unload activities and within its time frame. Even when a vessel is dry docked for major repairs, the replacement or repair of the metallic hatch cover support pads is a time consuming, complex and expensive task.

SUMMARY OF THE INVENTION

The present invention overcomes the above-briefly discussed and other deficiencies and disadvantages of the prior art by providing a novel replaceable bearing structure, suitable for use in supporting a hatch cover, which is easy to install and replace, is self-maintaining, has a relatively long service life expectancy, can be fabricated entirely from components which are corrosion resistant and, most importantly, includes a low friction self-lubricated surface which is capable of absorbing and supporting very large loads and elastically accommodating irregularities in contact surfaces.

A bearing in accordance with the invention comprises a base plate and a pillow plate, both of which will typically be of generally rectangular shape. A deformable sub-base plate is sandwiched between the base plate and pillow plate and affixed to each. The sub-base plate is initially larger than the pillow plate in both the length and width dimensions. An engineered self-lubricating pad is draped over the pillow plate. This pad is a woven member comprised of threads which have a predetermined orientation. In accordance with a preferred embodiment, the threads used in forming the woven pad comprise multiple intertwisted continuous filaments. These filaments may, for example, be comprised of PTFE fluorocarbon fibers. The opposite edge regions of the sub-base plate are folded toward one another to capture the lubricant pad. The completed bearing assembly is designed to be secured to the hatch cover support pad.

BRIEF DESCRIPTION OF THE DRAWINGS

The present invention may be better understood and its numerous objects and advantages will become apparent to those skilled in the art by reference to the accompanying drawings wherein like reference numerals refer to like elements in the several figures and in which.

DESCRIPTION OF THE DISCLOSED EMBODIMENT

Figure 1:
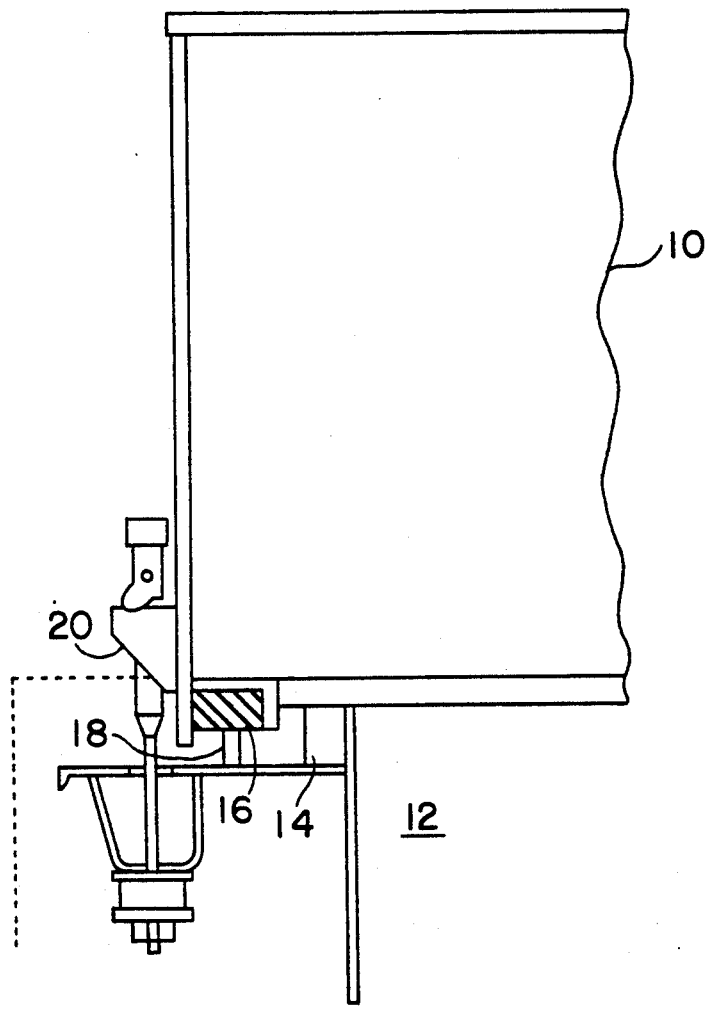
FIG. 1 is a schematic showing of a use environment for the present invention.

Referring to FIG. 1, an environment wherein the present invention has exceptional utility is shown schematically. Thus, FIG. 1 is a partial view of a hatch cover 10 in place on a vessel. On a typical container vessel, the hatch covers are located on hatch coamings by centering devices which act as positioners while also imparting longitudinal and transversal restraint and at the same time allowing for relative coaming movements when the vessel is underway. Support for the hatch covers is provided by a plurality of support pads 14. The relative movement between the coaming and hatch cover dictates that the interface between each of the support pads 14 and the cover 10 function as a bearing surface. The hatch covers are made weather-tight by means of a flexible seal 16 which extends about the periphery of the cover 10. The seal 16 is typically provided with a slot in its downwardly facing side, the slot engaging an upstanding rib 18. The cover 10 is battened by hold down mechanisms. In FIG. 1 a hold down mechanism is represented by a quick acting cleat 20. As will be obvious to those skilled in the art, the seal 16 may be disposed either inwardly or outwardly from the hatchway 12 with respect to the support pads 14. Also, the support pads 14 may engage either structural members on the underside of the cover or struts which extend outwardly from the cover.

As discussed above, in the prior art the interface between each of the local support pads 14 and the cooperating support element of the cover has been in the form a planar metal surface in sliding contact with another planar metal surface. During the relative coaming movements, wear of these surfaces inherently occurred. This wear, if repairs were not timely made, would result in either or both of damage to the seal 16 or impeding movement between the cover and coaming with resultant structural damage to the cover.

Figure 2:
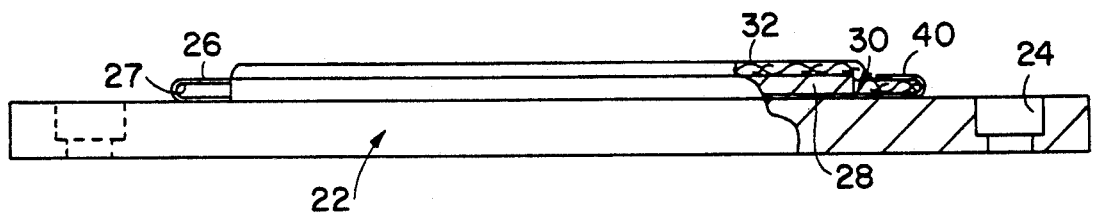
FIG. 2 is a side view, partly in section, of a hatch cover bearing in accordance with a preferred embodiment of the invention.
Figure 3:
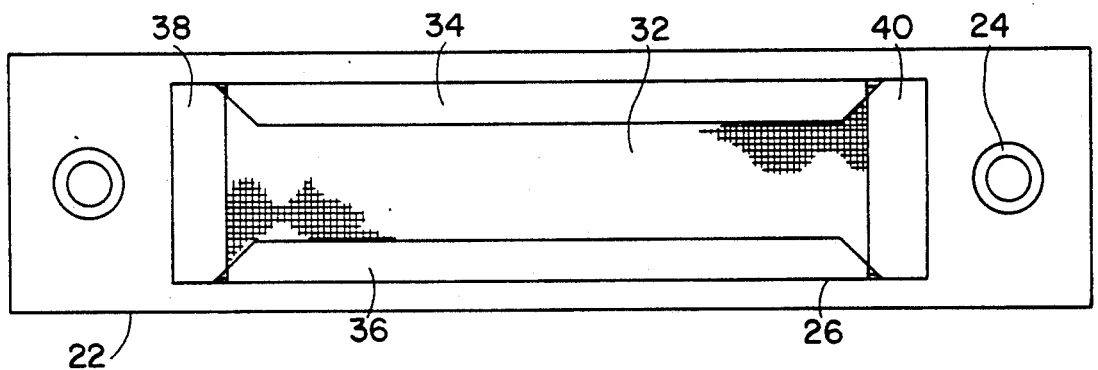
FIG. 3 is a top view of the bearing of FIG. 2.

Referring to FIGS. 2 and 3, an easily replaceable lubricated hatch cover bearing which can be mounted on top of a hatch cover support pad, such as pad 14 of FIG. 1, is shown. This novel hatch cover bearing comprises a base plate 22 which is provided with suitable means by which it may be affixed to the top of a support pad 14. In the disclosed embodiment the fixation means comprises counterbored through-holes 24 which receive mounting bolts. A sub-base plate 26 is welded to base plate 22. Sub-base plate 26 is typically comprised of stainless steel and is fabricated from a gauge metal which permits the four edge portions thereof to be folded back on themselves to provide two pairs of facing capture slots such as slot 27 (FIG. 2). A pillow plate 28 is affixed to the sub-base plate 26. Pillow-plate 28 is also typically comprised of stainless steel and, in the disclosed embodiment, is smaller in both the length and width dimensions when compared to the sub-base plate 26. The attachment of the pillow plate 28 to the sub-base plate 26 will typically be by means of fillet welds, such as weld 30, which extend across the entire width and/or length of the pillow plate.

A woven lubricant pad 32 is provided over pillow plate 28. Pad 32 is larger than plate 28, has a limited amount of elasticity and is flexible. Accordingly, the edge portions of pad 32 drape over the four edges of plate 28. As noted above, in accordance with a preferred embodiment, pad 32 is woven from multifilament threads comprising a self-lubricating material such as PTFE to provide an oriented fibrous weave. Pad 32 may also be comprised of multiple types of fibers such as, for example, PTFE and aramid.

The bearing is assembled by welding plates 22, 26 and 28 together as described above. Next, the pad 32 is positioned over plate 28. The edge regions of plate 26 are then folded back on themselves to define overlaps or flaps 34, 36, 38 and 40. Each of the flaps defines a capture slot 27 for one of the four edges of pad 32. The flaps formed by folding sub-plate 26, i.e., the side flaps 34, 36 and the end flaps 38, 40, define gaps through which pad 32 passes and in which the pad is pinched. The thickness of the pad 32 and the radius of the bends formed when sub-plate 26 is folded are chosen so that the outwardly facing exposed portions of plate 26 are co-planar with or lower than the upper surface of pillow plate 28 and are thus disposed below the level of the exposed surface of pad 32.

When in use, the woven pad 32, due to its elasticity, will absorb impacts when the hatch cover is installed and will also accommodate dimensional irregularities such as a lack of parallelism between a contact surface on the hatch cover and the top of a support pad 14. Because of its construction from a self-lubricating material, and its resistance to wear, the pad 32 will function as an efficient bearing surface over a long period of time. As a result of the fact that all of the components of the bearing assembly of the invention can be constructed from corrosion resistant materials, the bearing assembly is particularly well suited for use in a moving environment.

While a preferred embodiment has been shown and described, various modifications and substitutions may be made thereto without departing from the spirit and scope of the invention. Accordingly, it is to be understood that the present invention has been described by way of illustration and not limitation.

What is claimed is:

1. A bearing assembly comprising:
   base means for supporting a bearing member, said base means being adapted to be secured to a support element;
   plate means for defining a bearing surface area;
   flexible, self-lubricating bearing means disposed over said plate means, said bearing means being a woven member comprised of at least a first fiber, said woven member conforming generally to the form of said plate means and extending beyond the edges thereof; and
   capture means sandwiched between and affixed to said base means and said plate means, the length and width of said capture means being greater than corresponding dimensions of said plate means, said capture means engaging edge regions of said woven bearing member which extend beyond said plate means to thereby retain said woven member on said plate means.

2. The bearing assembly of claim 1 wherein said capture means is wrapped around the edge regions of said woven bearing member and wherein a gap is defined between each side edge of said plate means and an end of said capture means, said woven pad passing through each said gap.

3. The bearing assembly of claim 2 wherein said base means and said plate means are comprised of metal.

4. The bearing assembly of claim 3 wherein said woven bearing member is a pad comprised of threads woven in accordance with a predetermined orientation and wherein said threads are comprised of twisted continuous filaments.

5. The bearing assembly of claim 2 wherein said woven bearing member is a pad comprised of threads woven in accordance with a predetermined orientation and wherein said threads are comprised of twisted continuous filaments of a material having a low coefficient of friction.

6. The bearing assembly of claim 1 wherein said woven bearing member is a pad comprised of multifilament threads.

7. The bearing assembly of claim 1 wherein said woven bearing member is a pad comprised of threads woven in accordance with a predetermined orientation and wherein said threads are comprised of twisted continuous filaments.

8. The bearing assembly of claim 1 wherein said base means and said plate means are comprised of metal.

9. The bearing assembly of claim 1 wherein said plate means comprises a pillow plate and wherein said capture means is comprised of a sheet of deformable stainless steel.

10. The bearing assembly of claim 9 wherein said capture means is wrapped around the edge regions of said woven bearing member and wherein a gap is defined between each side edge of said pillow plate and an end of said capture means, said woven pad passing through each said gap.

11. The bearing assembly of claim 10 wherein said pillow plate is comprised of metal and the length and width of said pillow plate are determined by the contact surface of the load to be supported on the bearing assembly.

12. The bearing assembly of claim 11 wherein said woven bearing member is a pad comprised of threads woven in accordance with a predetermined orientation and wherein said threads are comprised of twisted continuous filaments.

13. The bearing assembly of claim 10 wherein said woven bearing member is a pad comprised of threads woven in accordance with a predetermined orientation and wherein said threads are comprised of twisted continuous filaments.

14. The bearing assembly of claim 11 wherein said woven bearing member is a pad comprised of multifilament threads consisting of a material having a low coefficient of friction.

* * * * *